United States Patent
Nehrke et al.

(10) Patent No.: US 12,493,093 B2
(45) Date of Patent: Dec. 9, 2025

(54) REDUCTION OF OFF-RESONANCE EFFECTS IN MAGNETIC RESONANCE IMAGING

(71) Applicant: KONINKLIJKE PHILIPS N.V., Eindhoven (NL)

(72) Inventors: Kay Nehrke, Hamburg (DE); Peter Boernert, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 499 days.

(21) Appl. No.: 17/914,435

(22) PCT Filed: Mar. 24, 2021

(86) PCT No.: PCT/EP2021/057540
§ 371 (c)(1),
(2) Date: Sep. 26, 2022

(87) PCT Pub. No.: WO2021/197955
PCT Pub. Date: Oct. 7, 2021

(65) Prior Publication Data
US 2023/0122915 A1    Apr. 20, 2023

(30) Foreign Application Priority Data
Apr. 1, 2020 (EP) ..................... 20167564

(51) Int. Cl.
*G01R 33/565* (2006.01)
*G01R 33/48* (2006.01)
*G01R 33/56* (2006.01)
*G06N 3/08* (2023.01)

(52) U.S. Cl.
CPC ... *G01R 33/56563* (2013.01); *G01R 33/4818* (2013.01); *G01R 33/5608* (2013.01); *G06N 3/08* (2013.01)

(58) Field of Classification Search
CPC ........ G01R 33/00; G01R 33/20; G01R 33/56; G01R 33/565; G01R 33/56563;
(Continued)

(56) References Cited

U.S. PATENT DOCUMENTS 5,311,132 A * 5/1994 Noll ................ G01R 33/56563
324/309
7,642,777 B1   1/2010 Meyer et al.
(Continued)

OTHER PUBLICATIONS

Noll et al "Deblurring for NON-2D Fourier Transform Magnetic Resonance Imaging" Magnetic Resonance in Med., vol. 25, No. 2 Jun. 1, 1992 p. 319-333.
(Continued)

*Primary Examiner* — Son T Le
*Assistant Examiner* — Matthew W. Baca

(57) ABSTRACT

Disclosed herein is a medical system comprising a memory (110) storing machine executable instructions (120) and a trained neural network (122). The trained neural network is configured to output corrected magnetic resonance image data (130) in response to receiving as input a set of magnetic resonance images (126) each having a different spatially constant frequency off-resonance factor. The medical system further comprises a computational system (106) configured for controlling the medical system, wherein execution of the machine executable instructions causes the computational system to: receive (200) k-space data (124) acquired according to a magnetic resonance imaging protocol: reconstruct (202) a set of magnetic resonance images (126) according to the magnetic resonance imaging protocol, wherein each of the set of magnetic resonance images is reconstructed assuming a different spatially constant frequency off-resonance factor chosen from a list of frequency off-resonance factors (128); and receive (204) the corrected magnetic
(Continued)

resonance image data in response to inputting the set of magnetic resonance images into the trained neural network.

19 Claims, 10 Drawing Sheets

(58) Field of Classification Search
 CPC .......... G01R 33/56572; G01R 33/5659; G01R 33/5608; G01R 33/5619; G01R 33/4818; G01R 33/4824; G01R 33/4826; G01R 33/243; G01R 33/561; G06N 3/02; G06N 3/08; G06N 3/045; G06T 5/80; G06T 5/60; G06T 11/003
 See application file for complete search history.

(56) References Cited

U.S. PATENT DOCUMENTS

| | | |
|---|---|---|
| 8,238,634 B1 | 8/2012 | Meyer et al. |
| 2005/0074152 A1 | 4/2005 | Lewin et al. |
| 2016/0202335 A1 | 7/2016 | Fielden et al. |
| 2019/0277935 A1 | 9/2019 | Zeng et al. |

OTHER PUBLICATIONS

Zeng et al "Deep Residual Network for Off-Resonance Artifact Correction With Application To Pediatric Body MRA With 3D Cones" Magnetic Reson. in Med. vol. 82, No. May 4, 22, 2019, p. 1398-1411.

Tamada "Review: Noise and Artifact Reduction for MRI Using Deep Learning" Feb. 28, 2020.

Kim et al "Artificial Neural Network for Suppression of Banding Artifacts in Balance Steady State Free Procession MRI" Magnetic Reson. Imaging, vol. 37, Nov. 27, 2016 p. 139-146.

Tamada et al "Method for Motion Artifact Reducing Using a Convolutional Neurual Network for Dynamic Contrast Enhanced MRI of the Liver" Jul. 18, 2018.

International Search Report and Written Opinion from PCT/EP2021/057540 mailed May 23, 2021.

Lai-Chee Man, John M. Pauly, Albert Macovski. Multifrequency Interpolation for Fast Off-resonance Correction. MRM 37:785-792 (1997).

Olaf Ronneberger, Philipp Fischer, and Thomas Brox. U-net: Convolutional networks for biomedical image segmentation. CoRR, abs/1505.04597, 2015.

Mahender K. Makhijani, et al., Exact Correction of Sharply Varying Off-Resonance Effects in Spiral MRI, IEEE ISBI, 2006, pp. 730-733.

Jinxing Li, et al., DRPL: Deep Regression Pair Learning for Multi-Focus Image Fusion, IEEE Transactions On Image Processing, Mar. 2, 2020, vol. 29, pp. 4816-4831.

Warren D. Foltz, et al., Optimized Spiral Imaging for Measurement of Myocardial T2 Relaxation, Magnetic Resonance in Medicine, 2003, 49, p. 1089-1097.

* cited by examiner

REDUCTION OF OFF-RESONANCE EFFECTS IN MAGNETIC RESONANCE IMAGING

CROSS REFERENCE TO RELATED APPLICATIONS

This application is a U.S. national phase application of International Application No. PCT/EP2021/057540 filed Mar. 24, 2021, which claims the benefit of EP Application Serial No. 20167564.2 filed Apr. 1, 2020 and is incorporated herein by reference.

TECHNICAL FIELD

The invention relates to Magnetic Resonance Imaging, in particular to reducing the effects of off-resonance effects such as blurring.

BACKGROUND OF THE INVENTION

A large static magnetic field is used by Magnetic Resonance Imaging (MRI) scanners to align the nuclear spins of atoms as part of the procedure for producing images within the body of a patient. This large static magnetic field is referred to as the B0 field or the main magnetic field. The strength of the B0 field, and any applied gradient magnetic fields, determine the frequency at which spins (typically protons in a Hydrogen nuclei) precess. Inhomogeneities in the B0 field can result in protons precessing at a different frequency than desired. The protons or other spins are then resonating off frequency. A B0 field inhomogeneity map or equivalently a frequency off-resonance mapping can be measured and used to make corrections during the reconstruction of the magnetic resonance image. There may be several difficulties. In some cases, an B0 inhomogeneity map may not be available or may be invalid, for example if the subject shifted position or moved.

United States patent application publication US 2016/0202335 A1 discloses a method of reducing off-resonance blurring in acquired magnetic resonance imaging data. The method includes acquiring a first set of spiral interleaf data for each of one or more spiral in/out interleaves by performing a first sampling each of one or more locations in k-space along a first redundant spiral in/out trajectory, and acquiring a second set of spiral interleaf data for each of the one or more spiral-in/out interleaves by performing a second sampling of each of the one or more locations in the k-space along a second redundant spiral-in/out trajectory, wherein the second redundant spiral-in/out trajectory corresponds to a time-reversed trajectory of the first redundant spiral-in/out trajectory. The method may yet further include combining the first set of spiral interleaf data and the second set of spiral interleaf data with an averaging operation such as to reduce artifacts.

SUMMARY OF THE INVENTION

The invention provides for a magnetic resonance imaging system, a computer program product and a method in the independent claims.

As was mentioned above inhomogeneities in the B0 magnetic field can result in off-resonance effects such as blurring in reconstructed magnetic resonance images. Embodiments may provide for a means of reducing or eliminating off-resonance effects such as blurring by using a trained neural network. Instead of acquiring a B0 magnetic field inhomogeneity map the acquired k-space data is used to reconstruct a set of magnetic resonance images. For each image in the set of magnetic resonance images a constant frequency off-resonance factor is chosen. What this does is that it produces a set of magnetic resonance images that are blurred except for the region where the off-resonance factor is correct. The trained neural network has been trained to take this set of magnetic resonance images as input and then to output corrected magnetic resonance image data.

The trained neural network may be incorporated in the magnetic resonance imaging system's computational system. Alternatively, the computational system may be provided with access to the trained neural network that is located remote from the (physical hardware of the) magnetic resonance imaging system, e.g. on a local server of the healthcare institution or the trained neural network may be accessible in 'the cloud'. The magnetic resonance imaging system is configured to arrange for reconstruction of the set of magnetic resonance images in that reconstruction software is installed in the computational system or in that the computational system has access to a remote reconstruction facility. The reconstruction software may be installed on a remote server, e.g. in the healthcare institution or even accessible to a data-network in that the reconstruction software may be available in 'the cloud'. In these remote configurations the computational system is equipped with functionality to arrange for reconstruction of the set of magnetic resonance images at the remotely located reconstruction function.

The neural network can be trained or configured in several different ways. In some examples the corrected magnetic resonance image data is a reconstructed magnetic resonance image. The neural network outputs the fully reconstructed image. In other examples the neural network may output a voxel mapping. The voxel mapping indicates a choice or selection for each voxel of the voxel mapping of one of the set of magnetic resonance images. This provides several things. The voxel mapping may for example be used to assemble a composite magnetic resonance image by using the voxel mapping to indicate which of the images should be used to supply the value for a particular voxel in the composite magnetic resonance image. Since each of the set of magnetic resonance images has a constant frequency off-resonance factor the voxel mapping may be used to assemble a frequency off-resonance map (or equivalently a B0 magnetic field inhomogeneity map).

Another potential benefit of the trained neural network is that it acts in image space and may be independent of the k-space sampling pattern. Embodiments may be particularly beneficial in correcting blurring artifacts when the k-space sampling pattern is spiral. However, the trained neural network may be used for a variety of sampling patterns.

The invention provides for a medical system, a method, and a computer program in the independent claims. Embodiments are given in the dependent claims.

In one aspect the invention provides for a medical system that comprises a memory storing machine-executable instructions and a trained neural network. The trained neural network may for example be a convolutional neural network. The trained neural network is configured to output corrected magnetic resonance image data in response to receiving as input a set of magnetic resonance images each having a different spatially constant frequency off-resonance factor. In magnetic resonance imaging the so-called B0 or main magnetic field may have inhomogeneities. The difference in the B0 magnetic field causes protons to resonate at a slightly off-resonance factor. The frequency off-resonance factor is therefore equivalent to the departure from the ideal value of the B0 field.

The medical system further comprises a computational system that is configured for controlling the medical system. Execution of the machine-executable instructions causes the computational system to receive k-space data acquired according to a magnetic resonance imaging protocol. Execution of the machine-executable instructions further causes the computational system to reconstruct a set of magnetic resonance images according to the magnetic resonance imaging protocol. Each of the set of magnetic resonance images is reconstructed assuming a different spatially constant frequency off-resonance factor chosen from a list of frequency off-resonance factors.

If the B0 map or the frequency off-resonance factor map were known then this could be used to directly reconstruct the k-space data into a magnetic resonance image. However, this may not be known or the data may be corrupted. Instead of providing a B0 map or a frequency off-resonance factor map or mapping, the k-space data is reconstructed assuming a different frequency off-resonance factor for each image that is reconstructed. The portions of the image which have an actual frequency off-resonance factor close to the constant frequency off-resonance factor will be essentially deblurred or clear in this region. The trained neural network may therefore be trained to look at a collection of magnetic resonance images that are input and select the regions which have the correct frequency off-resonance factor. This may be useful in either reconstructing the magnetic resonance image directly or using it to reconstruct a B0 map or frequency off-resonance factor mapping.

Execution of the machine-executable instructions further causes the computational system to receive the corrected magnetic resonance image data in response to inputting the set of magnetic resonance images into the trained neural network. This embodiment may be beneficial because the neural network enables a correction for the off-resonance factor or B0 inhomogeneities without a pre-measured B0 map or frequency off-resonance factor map. This may for example be useful in avoiding the acquisition of a B0 map or even correcting it in case it becomes corrupted. For example, the B0 map may be measured and then the subject may move as the k-space data is acquired. In this case the B0 map would no longer be valid. Embodiments provide a means of correcting for B0 inhomogeneities without having measured a B0 map.

In another embodiment the corrected magnetic resonance imaging data comprises an inhomogeneity corrected magnetic resonance image. In this embodiment the corrected magnetic resonance imaging data is directly reconstructed into the corrected image.

In another embodiment the output corrected magnetic resonance image data is complex valued. This may mean that the output of the neural network corresponds to voxels and that for each voxel there are two components: either a real and imaginary component or a magnitude and phase.

In another embodiment the corrected magnetic resonance image comprises a pixel mapping. Each of the set of magnetic resonance images has an identically-sized voxel matrix. The voxel mapping comprises a selection of one of the set of magnetic resonance images for each voxel of the identically-sized voxel matrix. In this embodiment the corrected magnetic resonance imaging data comprises a map which identifies which pixels from which images are essentially deblurred or clear. This may have several different uses. For example, the image may be reconstructed by taking the appropriate pixels using the pixel mapping. In other examples the pixel mapping may be converted into a B0 inhomogeneity map. This for example may enable to first use the k-space data and reconstruct a B0 map and then use a conventional magnetic resonance imaging algorithm to reconstruct the image using this B0 inhomogeneity map.

In another embodiment the voxel matrix of each of the set of magnetic resonance images has an identical size. Essentially these images are spatially consistent. The pixel mapping may have a mapping for each voxel of the voxel matrix.

In another embodiment execution of the machine-executable instructions further causes the computational system to assemble a composite magnetic resonance image by selecting voxels from the set of magnetic resonance images according to the pixel mapping. In this embodiment the composite magnetic resonance image is assembled by choosing the voxels that are identified by the pixel mapping. This may for example enable the computational system to assemble the composite magnetic resonance image using the best available voxels which have the least blurring in them.

In another embodiment execution of the machine-executable instructions further causes the computational system to assemble a B0 inhomogeneity map and/or a frequency off-resonance mapping by assigning the constant frequency off-resonance factor from the set of magnetic resonance images according to the voxel mapping. When each of the set of magnetic resonance images was reconstructed a particular frequency off-resonance factor was assigned and used for the reconstruction. A knowledge of the voxel mapping as well as these frequency off-resonance factors may be used to reconstruct the B0 inhomogeneity map.

In other embodiments a spatial filter or smoothing algorithm is applied to the B0 inhomogeneity mapping.

In another embodiment execution of the machine-executable instructions further causes the computational system to reconstruct a B0 inhomogeneity-corrected magnetic resonance image from the k-space data and the B0 inhomogeneity mapping or the frequency off-resonance mapping. In this embodiment instead of cobbling together an image or having a neural network output the resulting image directly the B0 inhomogeneity map that was determined by the neural network and using the voxel mapping is applied in a conventional magnetic resonance imaging algorithm. This for example may make a system extremely flexible. The system can essentially be used to reconstruct images regardless of the type of magnetic resonance imaging protocol that is selected. The neural network is trained simply for reconstructing a B0 inhomogeneity map or its equivalent and then the reconstruction is applied using the normal algorithm.

In another embodiment the machine-executable instructions further causes the computational system to assemble the corrected magnetic resonance image data by applying the trained neural network to portions of the said magnetic resonance images using a spatial sliding window algorithm. A particular difficulty in using a neural network is that a certain input size and output size of the data is assumed. In this embodiment the neural network may be trained such that it takes as input an image size that is smaller than the actual magnetic resonance image. To then reconstruct a full image the spatial sliding window algorithm breaks the full image into several pieces and the resulting image for each one is calculated. It is then relatively straight forward to take these multiple images and combine them into a larger image.

In another embodiment the machine-executable instructions are configured to cause the computational system to assemble the corrected magnetic resonance image data by applying the trained neural network to sub-groups of the set of magnetic resonance images. In some cases, the number of layers in a magnetic resonance image may vary. It may therefore be impractical to have a trained neural network that can accept an arbitrary number of layers. One way around this would be to have a trained neural network and then to divide the data into sub-groups and process these separately using the trained neural network. For example, if the trained neural network were able to accept voxels which had three layers and one had a magnetic resonance image with nine layers, one could divide first the magnetic resonance image into three groups of three layers with one result. One could then input the result from those three layers into the trained neural network again and obtain a final result.

In another embodiment the magnetic resonance imaging protocol is a parallel imaging magnetic resonance imaging protocol. The trained neural network works in image space so the underlying scheme used to acquire the images may work in many different cases technically.

In another embodiment each of the of set of magnetic resonance images is complex valued. The voxels for each of the set of magnetic resonance images has a complex value. This may be represented by two components: either a real and imaginary component or a magnitude and phase.

In another embodiment the trained neural network is a U-net convolutional neural network. A U-net convolutional neural network is extremely effective in processing medical images. In a U-net there is a contracting and an expansive path. This is why it has a U-shaped architecture and from which it derives its name. The U-net is effective for medical image processing because correlations on both a small and large scale can be compared.

In another embodiment the medical system further comprise a magnetic resonance imaging system configured to acquire the k-space data from an imaging zone. The memory further contains pulse sequence commands configured to control the magnetic resonance imaging system to acquire the k-space data. Execution of the machine-executable instructions further causes the computational system to control the magnetic resonance imaging system to acquire the k-space data.

In another embodiment the k-space data has a non-Cartesian sampling pattern.

In another embodiment the k-space data has a spiral sampling pattern. This embodiment may be beneficial because spiral imaging patterns in k-space are particularly prone to off-resonance effects. This may provide a means for correcting magnetic resonance images that have a spiral imaging pattern in k-space.

In another aspect the invention provides for a method of training a neural network. The method comprises configuring a topology of the neural network to receive as input a set of magnetic resonance images each having a different spatially constant frequency off-resonance factor. This for example may include configuring the neural network to receive a set of identically-sized magnetic resonance images. The method further comprises configuring the topology of the neural network to output a corrected magnetic resonance image data. The method further comprises receiving training data. The training data comprises datasets comprising a deep learning magnetic resonance image reconstructed using a spatially varying frequency off-resonance map and multiple magnetic resonance images each reconstructed using a different spatially constrained frequency off-resonance map. Within each of these datasets there is a magnetic resonance image which has been reconstructed using a correct spatially varying frequency off-resonance map.

The multiple training magnetic resonance images are then reconstructed from the same k-space data but instead of using the spatially varying frequency off-resonance map, a spatially constant value is used for the off-resonance frequency for each one. The training data may then for example be used for training the neural network using a deep learning scheme. The method further comprises producing a trained neural network by repeatedly training the neural network with each of the datasets.

In another aspect the invention provides for a computer program comprising machine-executable instructions for execution by a computational system controlling the medical system. Execution of the machine-executable instructions causes the computational system to receive k-space data acquired according to a magnetic resonance imaging protocol. Execution of the machine-executable instructions further causes the computational system to reconstruct a set of magnetic resonance images according to the magnetic resonance imaging protocol. Each of the set of magnetic resonance images is reconstructed assuming a different spatially constant frequency off-resonance factor chosen from a list of frequency off-resonance factors. Execution of the machine-executable instructions further causes the computational system to receive the corrected magnetic resonance image data in response to inputting the set of magnetic resonance images into a trained neural network. The trained neural network is configured to output corrected magnetic resonance image data in response to receiving as input a set of magnetic resonance images each having a different spatially constant frequency off-resonance factor.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

K-space data is defined herein as being the recorded measurements of radio frequency signals emitted by atomic spins using the antenna of a Magnetic resonance apparatus during a magnetic resonance imaging scan. Magnetic resonance data is an example of tomographic medical image data.

A Magnetic Resonance Imaging (MRI) image or MR image is defined herein as being the reconstructed two- or three-dimensional visualization of anatomic data contained within the magnetic resonance imaging data. This visualization can be performed using a computer.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
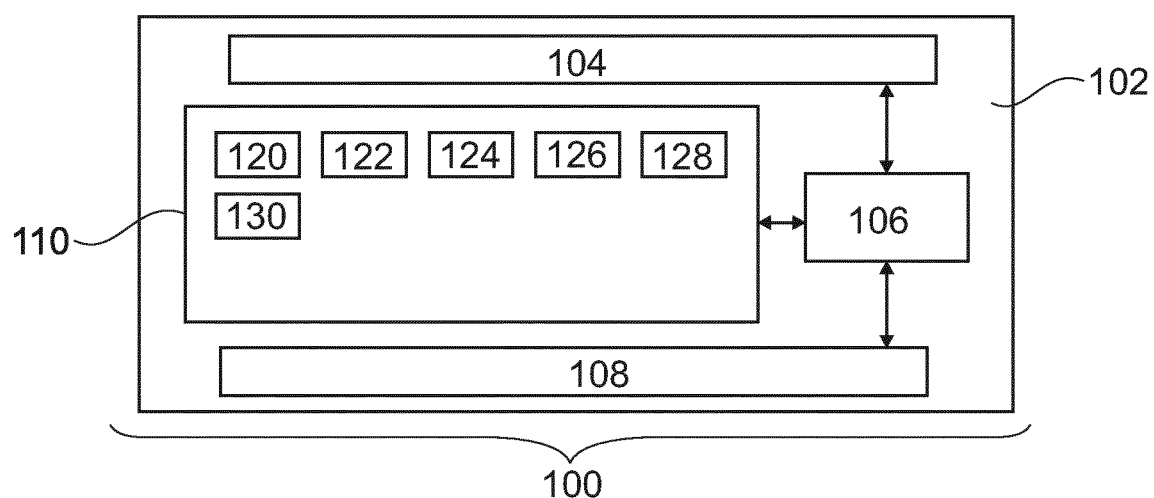
FIG. 1 illustrates an example of a medical system.

FIG. 1 illustrates an example of a medical system 100. The medical system 100 is shown as comprising a computer 102. The computer 102 is shown as containing a computational system 106 that is connected to a hardware interface 104, a user interface 108, and a memory 110. The computational system 106 is intended to represent one or more processing units which may also be distributed amongst multiple computers 102. The hardware interface 104 may for example be used by the computational system 106 to control external components or additional components of the medical system 100 for example, if the medical system 100 comprises a magnetic resonance imaging system. The memory may, for example, be any type of memory accessible to the computational system.

The computer 102 may also be a virtual machine or other machine which is located in the cloud or at a remote location and used for computationally intensive tasks.

The memory is shown as containing machine executable instructions 120. The machine executable instructions may for example be executed by the computational system 106. The machine executable instructions may for example enable the computational system to control the components of the medical system 100 as well as perform various data and image analysis functions.

The memory 110 is further shown as comprising a trained neural network 122. The trained neural network 122 has been trained or configured such that it outputs corrected magnetic resonance image data in response to receiving as input a set of magnetic resonance images each having a different spatially constant frequency off-resonance factor. The memory 110 is further shown as containing k-space data 124. The memory 110 is further shown as containing a set of magnetic resonance images 126 that have been reconstructed from the k-space data 124 by assuming a distinct spatially constant frequency off-resonance factor selected from a list of frequency off-resonance factors 128. The memory 110 is further shown as comprising a corrected magnetic resonance image data 130 that was received from the trained neural network 122 in response to inputting the set of magnetic resonance images 126.

Figure 2:
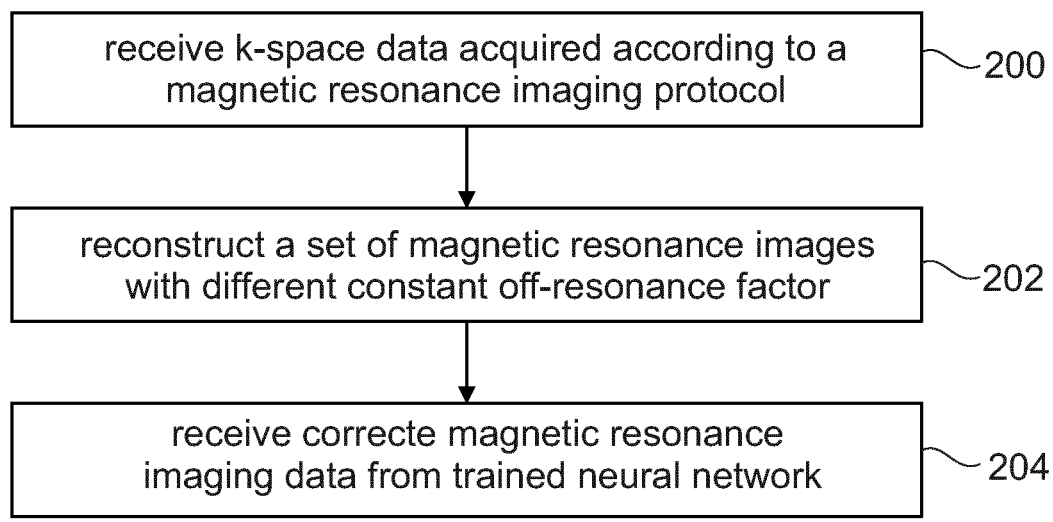
FIG. 2 shows a flow chart which illustrates an example of a method of operating a medical system according to claim 1.

FIG. 2 shows a flowchart which illustrates a method of operating the medical system 100 of FIG. 1. First, in step 200, the k-space data 124 is received. Next, in step 202, the set of magnetic resonance images 126 is reconstructed according to the magnetic resonance imaging protocol. Each of the set of magnetic resonance images is reconstructed assuming a different spatially constant frequency off-resonance factor chosen from a list of frequency off-resonance factors 128. Finally, in step 204, the corrected magnetic resonance image data 130 is received in response to inputting the set of magnetic resonance images 126 into the trained neural network 122.

Figure 3:
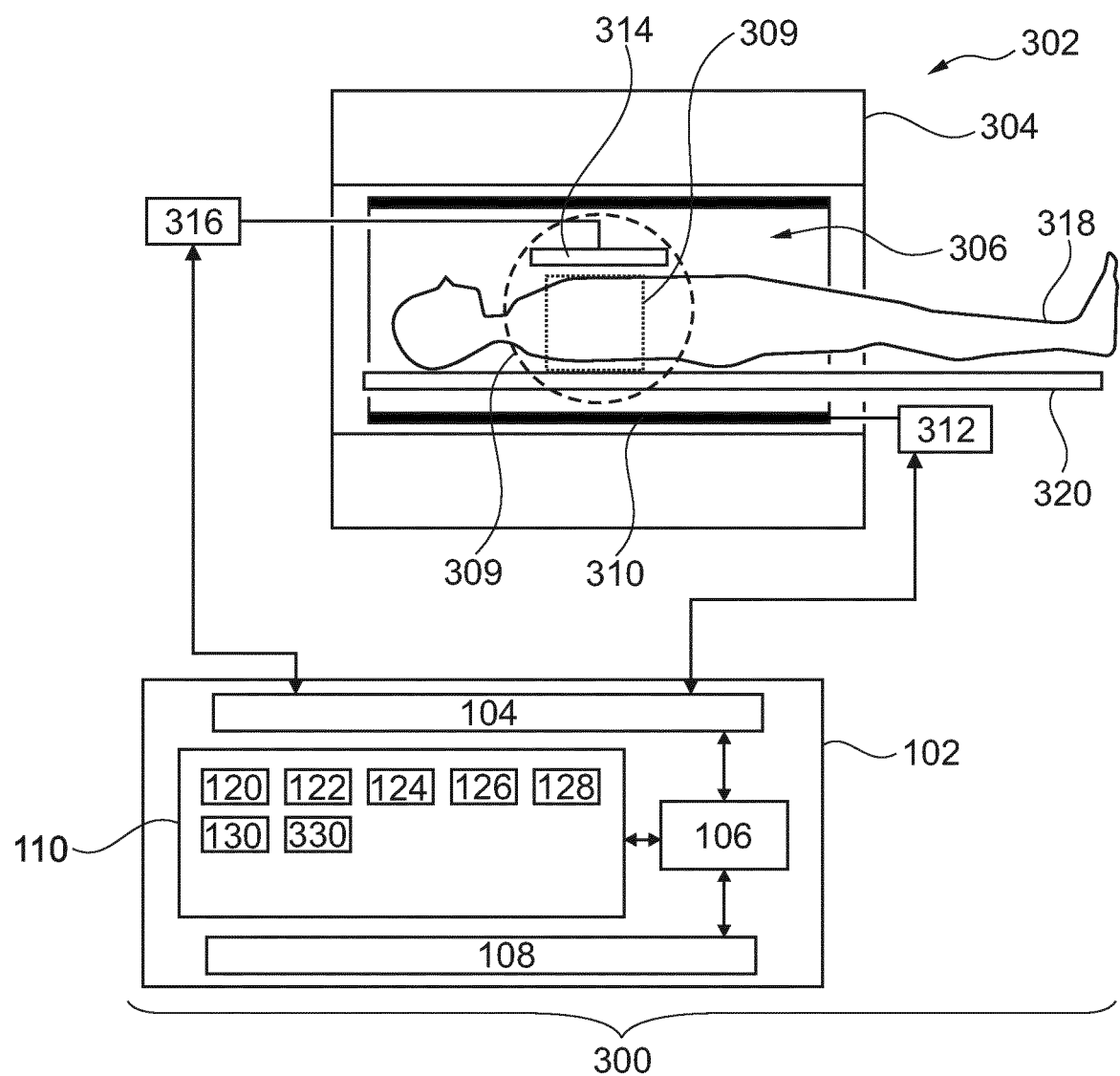
FIG. 3 illustrates a further example of a medical system.

FIG. 3 illustrates a further example of a medical system 300. The medical system 300 depicted in FIG. 3 is similar to the medical system 100 in FIG. 1 except the medical system additionally comprises a magnetic resonance imaging system 302.

The magnetic resonance imaging system 302 comprises a magnet 304. The magnet 304 is a superconducting cylindrical type magnet with a bore 306 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 306 of the cylindrical magnet 304 there is an imaging zone 308 where the magnetic field is strong and uniform enough to perform magnetic resonance imaging. A region of interest 309 is shown within the imaging zone 308. The magnetic resonance data that is acquired typically acquired for the region of interest. A subject 318 is shown as being supported by a subject support 320 such that at least a portion of the subject 318 is within the imaging zone 308 and the region of interest 309.

Within the bore 306 of the magnet there is also a set of magnetic field gradient coils 310 which is used for acquisition of preliminary magnetic resonance data to spatially encode magnetic spins within the imaging zone 308 of the magnet 304. The magnetic field gradient coils 310 connected to a magnetic field gradient coil power supply 312. The magnetic field gradient coils 310 are intended to be representative. Typically magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 308 is a radio-frequency coil 314 for manipulating the orientations of magnetic spins within the imaging zone 308 and for receiving radio transmissions from spins also within the imaging zone 308. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise the transceiver 316 may also represent a separate transmitter and receivers. The radio-frequency coil 314 may also have multiple receive/transmit elements and the radio frequency transceiver 316 may have multiple receive/transmit channels. For example if a parallel imaging technique such as SENSE is performed, the radio-frequency could 314 will have multiple coil elements.

The transceiver 316 and the gradient controller 312 are shown as being connected to the hardware interface 106 of a computer system 102.

The memory 110 is further shown as comprising pulse sequence commands 330. The pulse sequence commands are commands or data which may be converted into such commands that enable the computational system 106 to control the magnetic resonance imaging system 302 to acquire the k-space data 124.

As was mentioned above, Non-Cartesian MR imaging techniques like e.g. spiral imaging are prone to off-resonance effects, resulting in significant blurring artifacts. If the spatial off-resonance is quantitatively known (by e.g. acquisition of a B0-field map), the effect can be corrected for during reconstruction. However, this requires the acquisition of an extra MR preparation scan, which might be compromised in accuracy by scan parameters and eddy currents.

Conjugate Phase Reconstruction (CPR) for non-Cartesian MRI

The MR signal s(t) acquired in the presence of off-resonance $\Delta\omega(r)$ may be written as:

$$s(t) = \int_V m(r)e^{-j(k(t)\cdot r+\Delta\omega(r)t)}dr \qquad [1]$$

where m(r) denotes the proton density and k(t) is the k-space trajectory. The off-resonance leads to artifacts, like blurring in case of the spiral, in the conventionally reconstructed image, derived from:

$$I(r) = \int_0^T s(t)W(t)e^{jk(t)\cdot r}dt \qquad [2]$$

where W(t) denotes a weighting factor used for compensation of sampling density and speed of k-space traversal. The blurring may be removed by a conjugate phase reconstruction (CPR), where the acquired signal is multiplied by a conjugate phase factor (1):

$$I_{CPR}(r) = \int_0^T s(t)W(t)e^{j(k(t)\cdot r+\Delta\omega(r)t)}dt \qquad [3]$$

provided the off-resonance is known from an additionally acquired B0-field map.

However, the CPR is computationally expensive, because the integral has to be solved for each pixel according to its own off-resonance $\Delta\omega(r)$.

Faster alternatives to the exact CPR denoted above approximations were proposed like frequency segmented CPR. For frequency-segmented CPR, the integral is approximated by a superposition of integrals with fixed demodulation frequencies:

$$I_{MF}(r) = \sum_{l=0}^{L-1} c_l(r) \int_0^T s(t)W(t)e^{j(k(t)\cdot r+\Delta\omega_l t)}dt \qquad [4]$$

The integral term can be solved efficiently using gridding and FFT for the chosen set of demodulation frequencies. The interpolator $c_l(r)$ is basically selecting the demodulation frequency closest to the off-resonance for the selected pixel. An alternate approach to frequency-segmented CPR is time-segmented CPR, where the integral in Eq. [3] is broken down into small time segments, where a constant off-resonance is used.

A U-NET (3) is a type of convolutional neural network (CNN) topology, which was proposed for biomedical image segmentation tasks.

The network consists of a contracting path and an expansive path, which leads to the U-shaped architecture.

The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path.

As outlined above, a B0 field map is required for CPR. The acquisition of the field map takes extra time and has to repeated to compensate for drifts in the resonance frequency. Moreover, the field map may be degraded by eddy-current induced spatial phase variations is prone to motion and other confounding factors.

Examples may apply an appropriately configured multidimensional neuronal network (e.g. a U-net) (trained neural network 122) to decide among many possible potential local off-resonances, which is the best to let the image appear sharp or with other words do the deblurring of the image without any knowledge of the field map.

Examples can find many applications in non-Cartesian MR imaging like spiral MR imaging.

To perform a frequency-segmented CPR, the blurred spiral image has first to be demodulated using a set of demodulation frequencies covering the actual field map range with a granularity, resulting in a multi-frequency dataset (set of magnetic resonance images 126). In a second step, each pixel is taken from that demodulated image from which the demodulation frequency is equal or close to the off-resonance of the selected pixel. If no field map is available, this could also be dividing the image into small areas (patches), and selects for each patch the modulation frequency, which minimizes blurring in this patch (cf. FIG. 4 below). This is straightforward, but very cumbersome, and may be performed by a trained neural network (cf. FIG. 5). The different demodulation frequencies correspond to the input channels of the network. The output is the deblurred image. In a refined implementation, the field map could be stored as complex phase of the output image (mapping the frequency range±f Max to ±PI).

Figure 4:
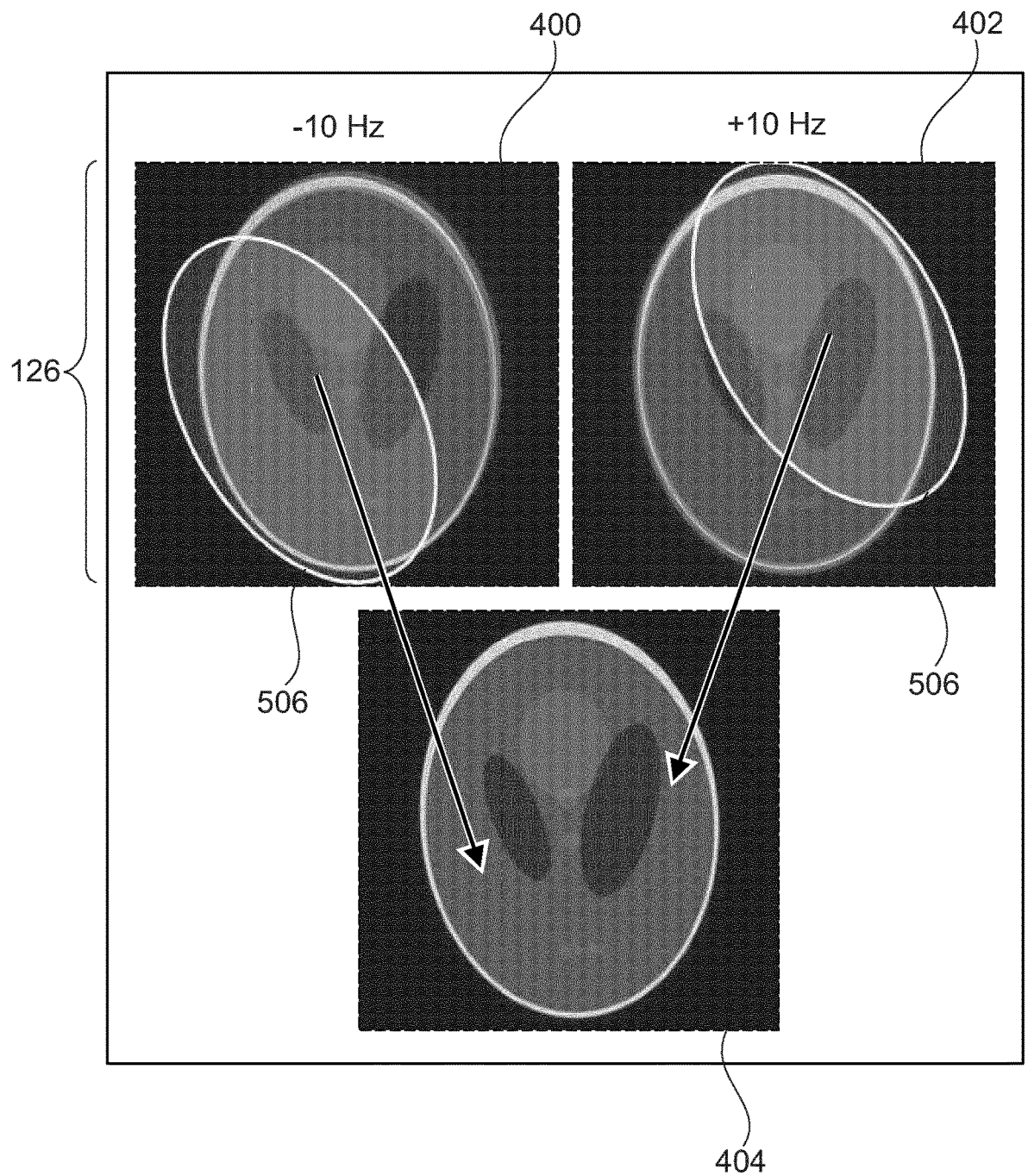
FIG. 4 illustrates a method of reconstructing a magnetic resonance image using a set of magnetic resonance images.

FIG. 4 illustrates how images can be deblurred. There are two images which represent a set of magnetic resonance images 126. The image below, 404, is a composite image made from the first image 400 and the second image 402. Both images 400 have a sharp image region 506 that is not blurry. The composite image 404 is a composite made from the two image regions 506 in each of the images 400 and 402. A deblurred image 404 can be derived by manually selecting sharp areas (ovals 506) from the multi-frequency data set for combining an unblurred image 404. Data for this figure was synthesized using the Shepp-Logan phantom and assuming random quadratic off-resonance terms in x and y direction.

Figure 5:
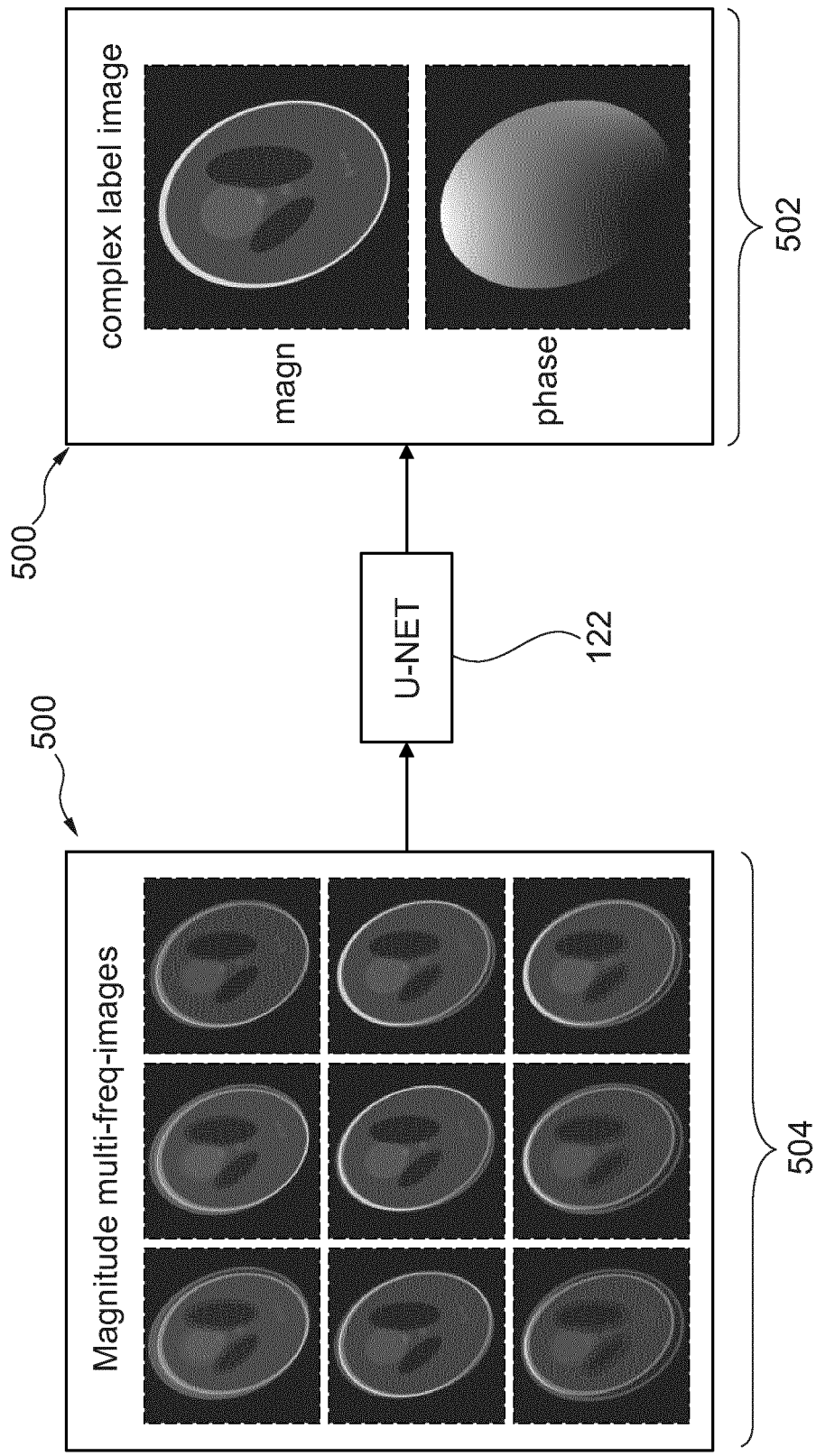
FIG. 5 illustrates the training of a neural network.
Figure 6:
FIG. 6 shows an example of a magnetic resonance image reconstructed using a B0 magnetic field inhomogeneity map.

FIG. 5 illustrates a method of training the trained neural network 122. In this example the neural network 122 is a U-net. There is a dataset of training data 500 that comprises a deblurred magnetic resonance image 502 and multiple training magnetic resonance images 504. By using repeated datasets of training data 500 and a deep net deep learning training scheme the neural network 122 may be trained. In use, the frequency-modulated spiral images serve as input channels, and the complex deblurred image (comprising a field map in the complex phase) represents the two output channels (real and imaginary part). Data were synthesized using the Shepp-Logan phantom and assuming random quadratic off-resonance terms in x and y direction.

The Shepp-Logan head (software) phantom was used to synthesize spiral images blurred by off-resonance. Field maps with constant, linear and quadratic off-resonance terms were used to generate blurring.

To increase robustness of learning, data augmentation was performed by rotating and scaling the phantom and varying the field map pattern.

Synthesized spiral Shepp-Logan phantom images (256× 256 image size) were generated and used to train a U-NET for off-resonance deblurring. The U-Net consisted of 4 down-sampling steps (each preceded by two convolution steps) and corresponding up-sampling steps and convolutions. Stochastic gradient descent using least-squares was used as optimizer. Data augmentation as described above was performed to improve robustness of learning.

In-vivo brain images were blurred assuming a spiral trajectory (50 ms duration) and a random field map (max±20 Hz). The blurred brain images were used as input for the trained network. FIG. 3 shows the original image along with the blurred and predicted (deblurred) image. In addition, the predicted field map is shown along with the underlying field map used for synthetization of the data. Both predicted anatomical image and field map are in very good accordance to the unblurred image and underlying field map. Note that the underlying field map was only used to synthesize the blurred image, and hence, was not explicitly fed into the U-NET.

Figure 10:
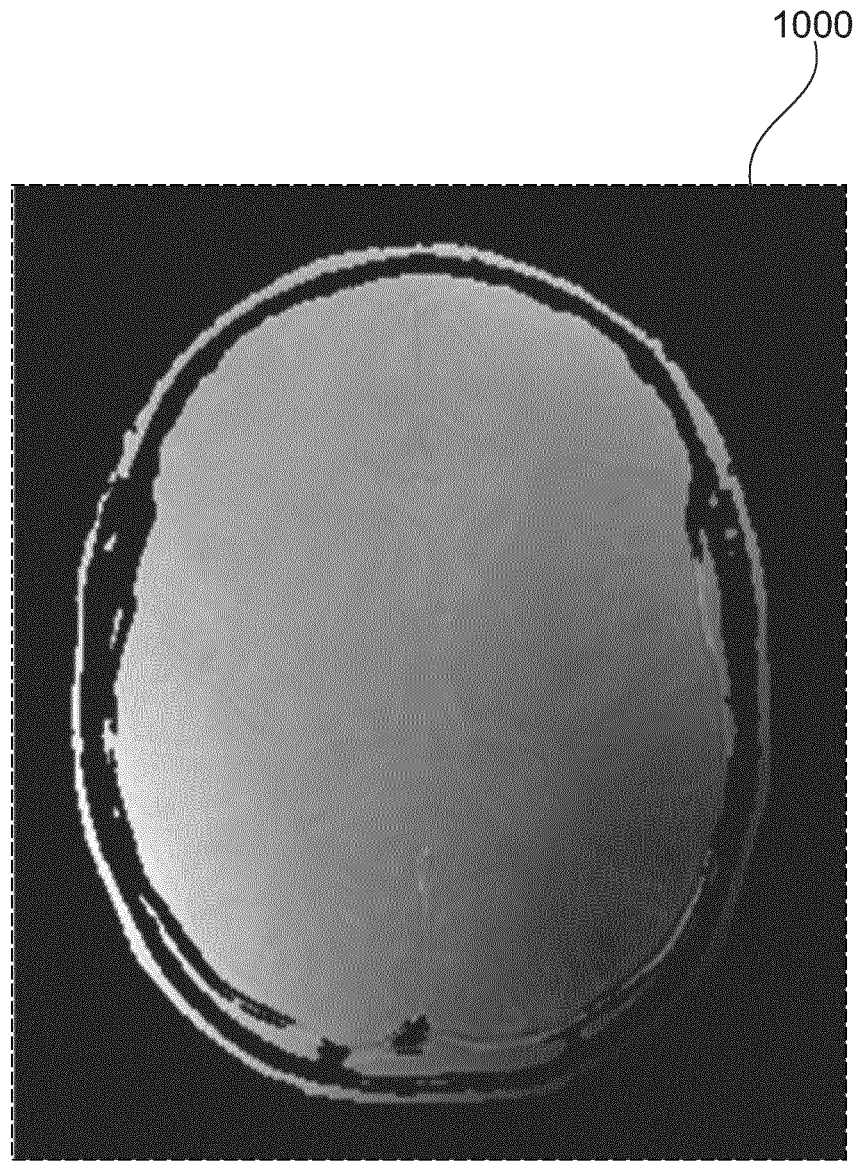
FIG. 10 illustrates the measured B0 magnetic field inhomogeneity map used to reconstruct FIG. 6.

FIGS. 6-10 are used to illustrate the effectiveness of the method. FIG. 600 shows the original magnetic resonance image 600. The image in FIG. 6 was reconstructed using a measured B0 inhomogeneity map which is depicted in FIG. 10 below.

Figure 7:
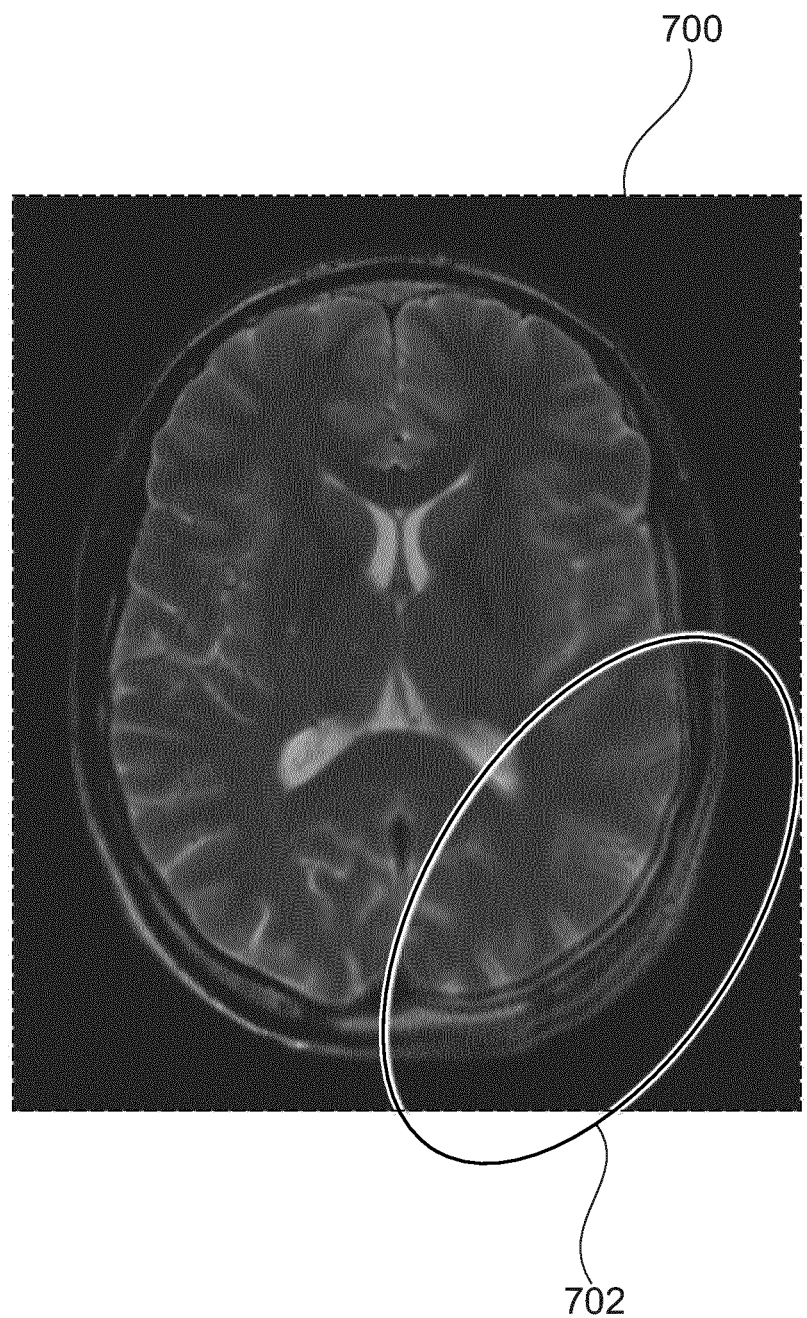
FIG. 7 shows a magnetic resonance image with blurring artifacts.

FIG. 7 depicts a blurred magnetic resonance image 700. It can be seen that the region circled by 702 has some blurring. This is due to the use of a spiral k-space sampling pattern.

Figure 8:
FIG. 8 shows a magnetic resonance image reconstructed with a trained neural network that corrects the blurring artifacts of FIG. 7.
Figure 9:
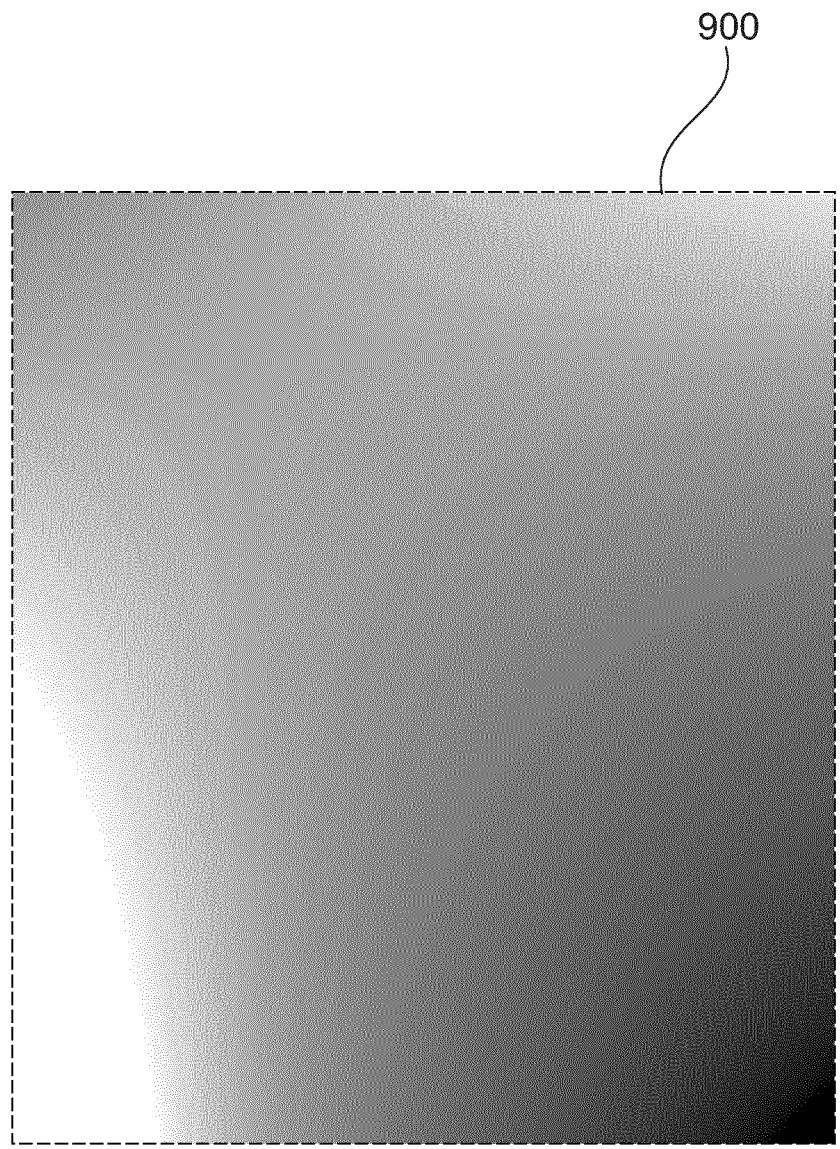
FIG. 9 shows a B0 magnetic field inhomogeneity map predicted by the neural network.

FIG. 8 illustrates a deblurred magnetic resonance image 800 that was deblurred using a trained neural network. It can be seen that the region in FIG. 7, 702, that was blurred is now reconstructed correctly in FIG. 8.

The neural network can also be used to calculate a predicted B0 inhomogeneity map 900. The actual measured B0 inhomogeneity map is depicted in FIG. 10 and is labeled 1000. It can be seen that the two inhomogeneity maps are similar.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single computational system, processor, or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 medical system
102 computer
104 hardware interface 106 computational system
108 user interface
110 memory
120 machine executable instructions
122 trained neural network
124 k-space data
126 set of magnetic resonance images
128 list of frequency off-resonance factors
130 corrected magnetic resonance image data
200 receive k-space data acquired according to a magnetic resonance imaging protocol
202 reconstruct a set of magnetic resonance images according to the magnetic resonance imaging protocol
204 receive the corrected magnetic resonance image data in response to inputting the set of magnetic resonance images into the trained neural network
300 medical system
302 magnetic resonance imaging system
304 magnet
306 bore of magnet
308 imaging zone
309 region of interest
310 magnetic field gradient coils
312 magnetic field gradient coil power supply
314 radio-frequency coil
316 transceiver
318 subject
320 subject support
330 pulse sequence commands
400 first image
402 second image
404 composite image
500 data set of training data
502 deblurred magnetic resonance image
504 multiple training magnetic resonance images
506 sharp image region
600 original magnetic resonance image
700 original image after spiral blurring
702 blurred region
800 deblurred image output by trained neural network
900 predicted B0 inhomogeneity map
1000 measured B0 inhomogeneity map

The invention claimed is:

1. A medical system comprising:
a memory configured to store machine executable instructions and a trained neural network, wherein the trained neural network is configured to output corrected magnetic resonance image data in response to receiving as input a set of magnetic resonance images, each magnetic resonance image of the set of magnetic resonance images having been reconstructed from k-space data assuming a different spatially constant frequency off-resonance factor, and
a computational system configured to control the medical system, wherein execution of the machine executable instructions causes the computational system to:
receive the k-space data acquired according to a magnetic resonance imaging protocol;
arrange for reconstruction of a set of magnetic resonance images according to the magnetic resonance imaging protocol, wherein each magnetic resonance image of the set of magnetic resonance images is reconstructed assuming a different spatially constant frequency off-resonance factor chosen from a list of frequency off-resonance factors; and
receive the corrected magnetic resonance image data in response to inputting the set of magnetic resonance images into the trained neural network,
wherein the trained neural network is trained by a method comprising:
configuring a topology of the neural network to receive as input a set of magnetic resonance images each having a different spatially constant frequency off-resonance factor;
configuring the topology of the neural network to output corrected magnetic resonance image data;
receiving training data, wherein the training data comprises data sets comprising a deblurred magnetic resonance image reconstructed from a k-space data set using a spatially varying frequency off-resonance map and multiple training images each reconstructed from the same k-space data set using a different spatially constant frequency off-resonance map; and
producing the trained neural network by repeatedly training the neural network with each of the data sets.

2. The medical system of claim 1, wherein the corrected magnetic resonance image data comprises an inhomogeneity corrected magnetic resonance image.

3. The medical system of claim 1, wherein the corrected magnetic resonance image data is complex valued.

4. The medical system of claim 1, wherein execution of the machine executable instructions further causes the computational system to assemble a composite magnetic resonance image by selecting voxels from the set of magnetic resonance images according to a pixel mapping.

5. The medical system of claim 1, wherein the corrected magnetic resonance image data output by the trained neural network comprises a voxel mapping, wherein each magnetic resonance image of the set of magnetic resonance images has an identically sized voxel matrix, wherein the voxel mapping comprises a selection of one magnetic resonance image of the set of magnetic resonance images for each voxel of the identically sized voxel matrix.

6. The medical system of claim 5, wherein execution of the machine executable instructions further causes the computational system to assemble a B0 inhomogeneity mapping and/or a frequency off-resonance mapping by assigning the constant frequency off-resonance factor from the set of magnetic resonance images according to the voxel mapping.

7. The medical system of claim 6, wherein execution of the machine executable instructions further causes the computational system to reconstruct a B0 inhomogeneity corrected magnetic resonance image from the k-space data and the B0 inhomogeneity mapping or the frequency off-resonance mapping.

8. The medical system of claim 1, wherein the machine executable instructions further cause the computational system to assemble the corrected magnetic resonance image data by applying the trained neural network to portions of the set of magnetic resonance images using a spatial sliding window algorithm.

9. The medical system of claim 1, wherein the machine executable instructions are configured to cause the computational system to assemble the corrected magnetic resonance image data by applying the trained neural network to sub groups of the set of magnetic resonance images.

10. The medical system of claim 1, wherein each magnetic resonance image of the set of magnetic resonance images is complex valued.

11. The medical system of claim 1, wherein the medical system further comprises a magnetic resonance imaging system configured to acquire the k-space data from an imaging zone, wherein the memory further contains pulse sequence commands configured to control the magnetic resonance imaging system to acquire the k-space data, wherein execution of the machine executable instructions further causes the computational system to control the magnetic resonance imaging system to acquire the k-space data.

12. The medical system of claim 1, wherein the k-space data has a non-Cartesian sampling pattern.

13. The medical system of claim 1, wherein the k-space data has a spiral sampling pattern.

14. A method of training a neural network, wherein the method comprises:
configuring a topology of the neural network to receive as input a set of magnetic resonance images each having a different spatially constant frequency off-resonance factor;
configuring the topology of the neural network to output corrected magnetic resonance image data;
receiving training data, wherein the training data comprises data sets comprising a deblurred magnetic resonance image reconstructed from a k-space data set using a spatially varying frequency off-resonance map and multiple training images each reconstructed from the same k-space data set using a different spatially constant frequency off-resonance map; and
producing a trained neural network by repeatedly training the neural network with each of the data sets.

15. A non-transitory computer readable medium storing machine executable instructions for execution by a computational system controlling a medical system, wherein execution of the machine executable instructions by the computational system causes the computational system to:
receive k-space data acquired according to a magnetic resonance imaging protocol;
arrange to reconstruct a set of magnetic resonance images according to the magnetic resonance imaging protocol, wherein each magnetic resonance image of the set of magnetic resonance images is reconstructed assuming a different spatially constant frequency off-resonance factor chosen from a list of frequency off-resonance factors; and
receive corrected magnetic resonance image data in response to inputting the set of magnetic resonance images into a trained neural network, wherein the trained neural network is configured to output the corrected magnetic resonance image data in response to receiving as input a set of magnetic resonance images each having been reconstructed from k-space data assuming a different spatially constant frequency off-resonance factor,
wherein the corrected magnetic resonance image data output by the trained neural network comprises a voxel mapping, wherein each magnetic resonance image of the set of magnetic resonance images has an identically sized voxel matrix, wherein the voxel mapping comprises a selection of one magnetic resonance image of the set of magnetic resonance images for each voxel of the identically sized voxel matrix,
wherein execution of the machine executable instructions further causes the computational system to train the trained neural network by:
configuring a topology of the neural network to receive as input a set of magnetic resonance images each having a different spatially constant frequency off-resonance factor;
configuring the topology of the neural network to output corrected magnetic resonance image data;
receiving training data, wherein the training data comprises data sets comprising a deblurred magnetic resonance image reconstructed from a k-space data set using a spatially varying frequency off-resonance map and multiple training images each reconstructed from the same k-space data set using a different spatially constant frequency off-resonance map; and
producing the trained neural network by repeatedly training the neural network with each of the data sets.

16. The non-transitory computer readable medium of claim 15, wherein the corrected magnetic resonance imaging data comprises an inhomogeneity corrected magnetic resonance image.

17. The non-transitory computer readable medium of claim 15, wherein the corrected magnetic resonance image data is complex valued.

18. The non-transitory computer readable medium of claim 15, wherein execution of the machine executable instructions further causes the computational system to assemble a composite magnetic resonance image by selecting voxels from the set of magnetic resonance images according to a pixel mapping.

19. The non-transitory computer readable medium of claim 15, wherein execution of the machine executable instructions further causes the computational system to assemble a B0 inhomogeneity mapping and/or a frequency off-resonance mapping by assigning the constant frequency off-resonance factor from the set of magnetic resonance images according to the voxel mapping.

* * * * *